June 14, 1932.　　　C. B. HARBISON　　　1,862,748
RETURN BEND
Filed June 27, 1931
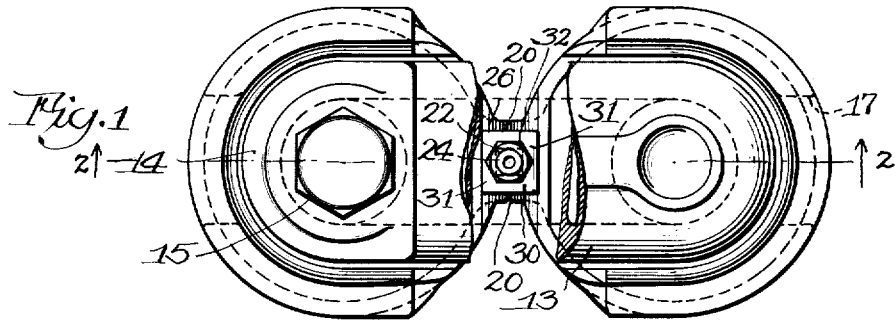
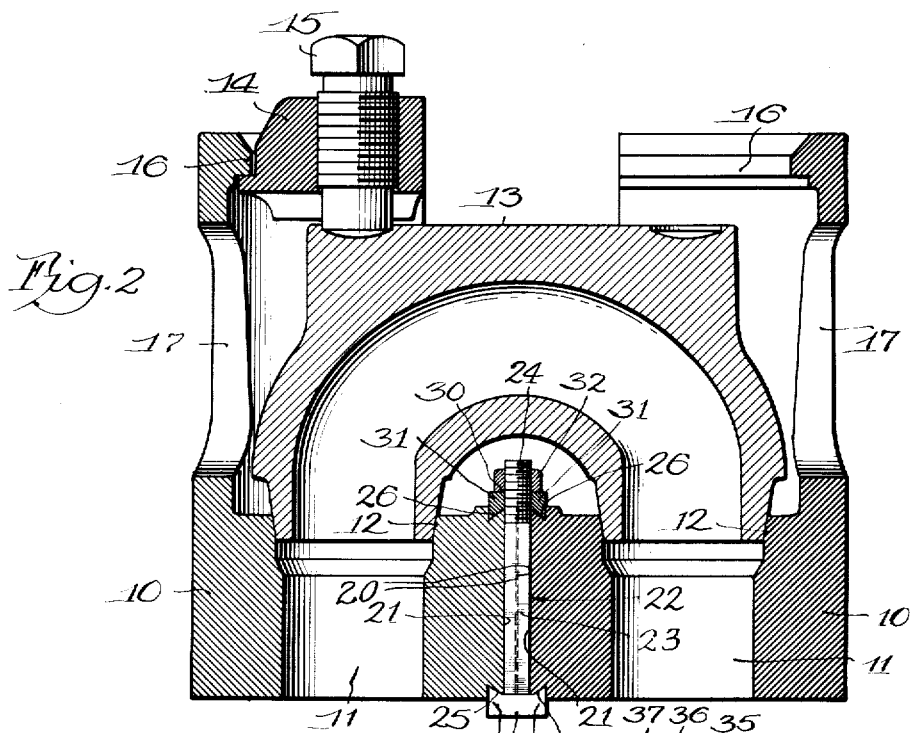
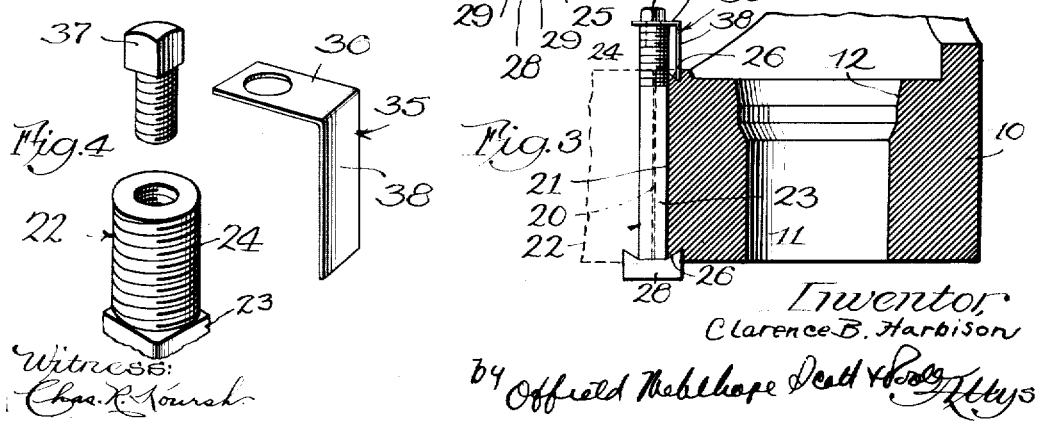
Inventor
Clarence B. Harbison Patented June 14, 1932

1,862,748

UNITED STATES PATENT OFFICE

CLARENCE B. HARBISON, OF LIMA, OHIO, ASSIGNOR TO THE OHIO STEEL FOUNDRY COMPANY, OF LIMA, OHIO, A CORPORATION OF OHIO

RETURN BEND

Application filed June 27, 1931. Serial No. 547,221.

This invention relates to improvements in return bend fittings for oil refineries, and more particularly to return bends in which the two yokes of said fittings are made in separable parts to permit individual replacement of the tube connected to one of the yokes without disturbing the companion yoke, its associated tube, or adjacent fittings.

Among the objects of the present invention is to provide means for detachably connecting the adjacent yokes of each return bend fitting together so as to restrain them from axial or rotational movement relative to each other, and to provide means to draw them positively toward each other. A further object is to provide a locking device operable from the outer side of the return bend fitting which will permit one of the yokes to be readily removed and replaced without disturbing the other yoke or the locking device.

The invention may best be understood by reference to the accompanying drawing, in which Figure 1 is an end view of a return bend fitting, in which my invention has been incorporated, with one of the locking pieces removed, and other parts broken away.

Figure 2 is a section taken on line 2—2 of Figure 1.

Figure 3 is a detail section showing one of the return bend yokes removed, and with the temporary bolt retaining means in use.

Figure 4 is a detail view of the parts of the bolt retaining means.

Referring now to details of the embodiment of my invention illustrated in the drawing, the return bend fitting includes a pair of yokes 10, 10 arranged side by side, and each provided with an aperture 11 in which the end of a refinery still tube (not shown) is suitably secured, in parallel relation with its companion tube. The tubes may be secured within the yokes by any suitable means, as by rolling them in. At the outer end of each of the tube apertures 11 is formed a flared connecting seat 12 which is engaged by opposite ends of a U-shaped bend fitting 13. Any suitable means may be provided for securing the bend fitting in place, in the form shown each of the yokes being provided with a detachable lock piece 14 having a set screw 15 therein, said lock piece being engageable beneath oppositely disposed flanged members 16, 16 on upstanding walls 17, 17 formed integral with each of the yokes, as shown.

Referring now more particularly to my improved form of locking device for fastening the yokes together, it will be observed in Figure 2 that said yokes are provided with plane abutting faces 20, 20 along adjacent sides. A longitudinally extending rectangular groove 21 is formed in each abutting face, said grooves being in registering relation with each other, so as to form a rectangular or square opening as indicated in Figure 1, within which is fitted a bolt 22 having a square body 23 and a threaded end 24.

At both the inner and outer ends of the abutting portions of the yokes are formed two pairs of oppositely disposed grooves 25, 25 and 26, 26, respectively. Each of said grooves is parallel to the adjacent margin of its adjacent face 20, and has its bottom surface inclined at an acute angle to its adjacent abutting face 20 as clearly shown in Figure 2.

At the inner end of the bolt 22 is formed a rectangular head 28 having its overhanging portions 29, 29 at opposite sides thereof inclined at an acute angle to the longitudinal axis of the bolt so as to fit within the grooves 25, 25 as clearly shown in Figure 2. A similarly shaped rectangular washer 30 is fitted on the opposite or threaded end 24 of said bolt, the overhanging portions 31, 31 at opposite sides thereof being also inclined to the longitudinal axis of the bolt so as to engage in the grooves 26, 26 formed on the outer ends of the yokes 10, 10. A nut 32 is secured on the threaded end 24 of bolt 22 in engagement with the washer 30 to hold the latter in place as shown.

Means are also provided for temporarily retaining the bolt in place of either one of the yokes when the companion yoke has been removed. For this purpose I provide an L-shaped attachment 35 having one leg 36 adapted to be detachably connected to the upper end of the bolt 22 by cap screw 37, and another leg 38 adapted to engage an adjacent surface of the yokes to which the bolt is to be temporarily clamped.

It will be understood that the clamping member 35 is secured in place after the nut 32 and washer 30 have been removed from the bolt 22, the lower end 38 of the clamping member then engaging an adjacent part of the yoke on which the bolt is to be temporarily supported, and preferably in the adjacent groove 26 as shown in Figure 3. The clamp 35, of course, is disconnected when the washer 30 and nut 32 are to be replaced for again securing the companion yoke in place.

From the above description it will now be understood that the adjacent pair of yokes of each return bend fitting are securely connected by bolt 22 so that said yokes cannot move either axially, laterally or rotationally relative to each other. While the bolt is being applied, the yokes are positively drawn together by the wedging action of head 28 and washer 30 in the inclined grooves 25 and 26, respectively.

When the nut 32 and washer 30 are removed, either yoke may be removed in an axial direction without disturbing its companion yoke, or any of the adjacent return bend fittings.

It will be understood further that the tubes of the stills are usually arranged in horizontal position with the return bend fittings in closely nested position at opposite ends thereof, so that the bolts 22, 22 are in horizontal position. Therefore, when the nut and washer of one of said bolts are removed, the bolt has no tendency to fall out endwise, but might be accidentally rotated or displaced when one of the yokes is removed or being replaced. The temporary clamping device 35 is therefore designed to permit one of the yokes to be removed or replaced endwise along the bolt 22 after its nut and washer have been removed, and to retain said bolt in place while the yoke is being replaced.

When the return bend is used in vertical position, the nut and washer may be loosened so as to permit the bolt to be supported by a pair of tongs until the clamping device 35 is put in place.

Although I have illustrated and described one particular embodiment of my invention, it will be understood that I do not wish to be limited to the exact construction shown and described, but that various changes and modifications may be made without departing from the spirit and scope of my invention.

I claim:

1. In a return bend fitting, a pair of separable yokes adapted to have mutual lateral engagement, a bolt disposed along and between the meeting faces of said yokes, and clamping means carried by said bolt having wedging action with said yokes to draw them toward each other.

2. In a return bend fitting, a pair of separable yokes adapted to have mutual lateral engagement and each provided with registering recesses disposed longitudinally of their meeting faces, a bolt fitting in said recesses with its threaded end projecting beyond the outer end of said yokes, and clamping means adjustably mounted on the threaded end of said bolt and having wedging action with said yokes to draw them toward each other.

3. In a return bend fitting, a pair of separable yokes adapted to have mutual lateral engagement and provided with registering rectangular recesses disposed longitudinally of their meeting faces, a bolt having its body portion rectangular in cross section fitting in said recesses with its threaded end projecting beyond the outer end of said yokes, and clamping means adjustably mounted on the threaded end of said bolt and having wedging action with said yokes to draw them toward each other.

4. In a return bend fitting, a pair of separable yokes adapted to have mutual lateral engagement and provided with registering recesses disposed longitudinally of their meeting faces, each of said yokes having grooves formed along their inner and outer surfaces parallel with and adjacent their meeting faces, a bolt fitting in the aperture formed by said registering recesses, said bolt having a head with overhanging portions adapted to have inwardly inclined engagement in the adjacent grooves at the inner ends of said yokes to draw the latter together, and a co-operating clamping member detachably mounted on the outer end of said bolt having overhanging portions engaging with the grooves on the outer faces of said yokes, said clamping member being detachable endwise of said bolt to permit either of said yokes to be withdrawn longitudinally without disturbing said bolt or its companion yoke.

5. In a return bend fitting, a pair of separable yokes adapted to have mutual lateral engagement and provided with registering recesses disposed longitudinally of their meeting faces, each of said yokes having grooves formed along their inner and outer surfaces parallel with and adjacent their meeting faces, a bolt fitting in the aperture formed by said registering recesses, said bolt having a head with overhanging portions adapted to have inwardly inclined engagement in the adjacent grooves at the inner ends of said yokes to draw the latter together, and a co-operating clamping member detachably mounted on the outer end of said bolt having overhanging portions engaging with the grooves on the outer faces of said yokes, a nut threaded on the end of said bolt engaging said clamping member, said clamping member being detachable endwise of said bolt to permit either of said yokes to be withdrawn longitudinally without disturbing said bolt or its companion yoke.

Signed at Chicago, Ill., this 22nd day of June, 1931.

CLARENCE B. HARBISON.

DISCLAIMER 1,862,748.—*Clarence B. Harbison*, Lima, Ohio. RETURN BEND. Patent dated June 14, 1932. Disclaimer filed September 7, 1933, by the patentee, and the assignee, *The Ohio Steel Foundry Company*.

Hereby enters this disclaimer to that part of the claims in said specification which is in the following words, to wit:

"1. In a return bend fitting, a pair of separable yokes adapted to have mutual lateral engagement, a bolt disposed along and between the meeting faces of said yokes, and clamping means carried by said bolt having wedging action with said yokes to draw them toward each other.

"2. In a return bend fitting, a pair of separable yokes adapted to have mutual lateral engagement and each provided with registering recesses disposed longitudinally of their meeting faces, a bolt fitting in said recesses with its threaded end projecting beyond the outer end of said yokes, and clamping means adjustably mounted on the threaded end of said bolt and having wedging action with said yokes to draw them toward each other."

"4. In a return bend fitting, a pair of separable yokes adapted to have mutual lateral engagement and provided with registering recesses disposed longitudinally of their meeting faces, each of said yokes having grooves formed along their inner and outer surfaces parallel with and adjacent their meeting faces, a bolt fitting in the aperture formed by said registering recesses, said bolt having a head with overhanging portions adapted to have inwardly inclined engagement in the adjacent grooves at the inner ends of said yokes to draw the latter together, and a cooperating clamping member detachably mounted on the outer end of said bolt having overhanging portions engaging with the grooves on the outer faces of said yokes, said clamping member being detachable endwise of said bolt to permit either of said yokes to be withdrawn longitudinally without disturbing said bolt or its companion yoke.

"5. In a return bend fitting, a pair of separable yokes adapted to have mutual lateral engagement and provided with registering recesses disposed longitudinally of their meeting faces, each of said yokes having grooves formed along their inner and outer surfaces parallel with and adjacent their meeting faces, a bolt fitting in the aperture formed by said registering recesses, said bolt having a head with overhanging portions adapted to have inwardly inclined engagement in the adjacent grooves at the inner ends of said yokes to draw the latter together, and a cooperating clamping member detachably mounted on the outer end of said bolt having overhanging portions engaging with the grooves on the outer faces of said yokes, a nut threaded on the end of said bolt engaging said clamping member, said clamping member being detachable endwise of said bolt to permit either of said yokes to be withdrawn longitudinally without disturbing said bolt or its companion yoke."

[*Official Gazette September 26, 1933.*]

a co-operating clamping member detachably mounted on the outer end of said bolt having overhanging portions engaging with the grooves on the outer faces of said yokes, a nut threaded on the end of said bolt engaging said clamping member, said clamping member being detachable endwise of said bolt to permit either of said yokes to be withdrawn longitudinally without disturbing said bolt or its companion yoke.

Signed at Chicago, Ill., this 22nd day of June, 1931.

CLARENCE B. HARBISON.

DISCLAIMER 1,862,748.—*Clarence B. Harbison*, Lima, Ohio. RETURN BEND. Patent dated June 14, 1932. Disclaimer filed September 7, 1933, by the patentee, and the assignee, *The Ohio Steel Foundry Company*.

Hereby enters this disclaimer to that part of the claims in said specification which is in the following words, to wit:

"1. In a return bend fitting, a pair of separable yokes adapted to have mutual lateral engagement, a bolt disposed along and between the meeting faces of said yokes, and clamping means carried by said bolt having wedging action with said yokes to draw them toward each other.

"2. In a return bend fitting, a pair of separable yokes adapted to have mutual lateral engagement and each provided with registering recesses disposed longitudinally of their meeting faces, a bolt fitting in said recesses with its threaded end projecting beyond the outer end of said yokes, and clamping means adjustably mounted on the threaded end of said bolt and having wedging action with said yokes to draw them toward each other."

"4. In a return bend fitting, a pair of separable yokes adapted to have mutual lateral engagement and provided with registering recesses disposed longitudinally of their meeting faces, each of said yokes having grooves formed along their inner and outer surfaces parallel with and adjacent their meeting faces, a bolt fitting in the aperture formed by said registering recesses, said bolt having a head with overhanging portions adapted to have inwardly inclined engagement in the adjacent grooves at the inner ends of said yokes to draw the latter together, and a cooperating clamping member detachably mounted on the outer end of said bolt having overhanging portions engaging with the grooves on the outer faces of said yokes, said clamping member being detachable endwise of said bolt to permit either of said yokes to be withdrawn longitudinally without disturbing said bolt or its companion yoke.

"5. In a return bend fitting, a pair of separable yokes adapted to have mutual lateral engagement and provided with registering recesses disposed longitudinally of their meeting faces, each of said yokes having grooves formed along their inner and outer surfaces parallel with and adjacent their meeting faces, a bolt fitting in the aperture formed by said registering recesses, said bolt having a head with overhanging portions adapted to have inwardly inclined engagement in the adjacent grooves at the inner ends of said yokes to draw the latter together, and a cooperating clamping member detachably mounted on the outer end of said bolt having overhanging portions engaging with the grooves on the outer faces of said yokes, a nut threaded on the end of said bolt engaging said clamping member, said clamping member being detachable endwise of said bolt to permit either of said yokes to be withdrawn longitudinally without disturbing said bolt or its companion yoke."

[*Official Gazette September 26, 1933.*]

DISCLAIMER 1,862,748.—*Clarence B. Harbison*, Lima, Ohio. RETURN BEND. Patent dated June 14, 1932. Disclaimer filed September 7, 1933, by the patentee, and the assignee, *The Ohio Steel Foundry Company*.

Hereby enters this disclaimer to that part of the claims in said specification which is in the following words, to wit:

"1. In a return bend fitting, a pair of separable yokes adapted to have mutual lateral engagement, a bolt disposed along and between the meeting faces of said yokes, and clamping means carried by said bolt having wedging action with said yokes to draw them toward each other.

"2. In a return bend fitting, a pair of separable yokes adapted to have mutual lateral engagement and each provided with registering recesses disposed longitudinally of their meeting faces, a bolt fitting in said recesses with its threaded end projecting beyond the outer end of said yokes, and clamping means adjustably mounted on the threaded end of said bolt and having wedging action with said yokes to draw them toward each other."

"4. In a return bend fitting, a pair of separable yokes adapted to have mutual lateral engagement and provided with registering recesses disposed longitudinally of their meeting faces, each of said yokes having grooves formed along their inner and outer surfaces parallel with and adjacent their meeting faces, a bolt fitting in the aperture formed by said registering recesses, said bolt having a head with overhanging portions adapted to have inwardly inclined engagement in the adjacent grooves at the inner ends of said yokes to draw the latter together, and a cooperating clamping member detachably mounted on the outer end of said bolt having overhanging portions engaging with the grooves on the outer faces of said yokes, said clamping member being detachable endwise of said bolt to permit either of said yokes to be withdrawn longitudinally without disturbing said bolt or its companion yoke.

"5. In a return bend fitting, a pair of separable yokes adapted to have mutual lateral engagement and provided with registering recesses disposed longitudinally of their meeting faces, each of said yokes having grooves formed along their inner and outer surfaces parallel with and adjacent their meeting faces, a bolt fitting in the aperture formed by said registering recesses, said bolt having a head with overhanging portions adapted to have inwardly inclined engagement in the adjacent grooves at the inner ends of said yokes to draw the latter together, and a cooperating clamping member detachably mounted on the outer end of said bolt having overhanging portions engaging with the grooves on the outer faces of said yokes, a nut threaded on the end of said bolt engaging said clamping member, said clamping member being detachable endwise of said bolt to permit either of said yokes to be withdrawn longitudinally without disturbing said bolt or its companion yoke."

[*Official Gazette September 26, 1933.*]